(12) United States Patent
Radulescu et al.

(10) Patent No.: US 11,502,541 B2
(45) Date of Patent: Nov. 15, 2022

(54) CUSTOMIZED SECONDARY POWER DISTRIBUTION ASSEMBLY GENERATED FROM CUSTOMIZABLE SECONDARY POWER DISTRIBUTION ASSEMBLY

(71) Applicant: Hamilton Sundstrand Corporation, Charlotte, NC (US)

(72) Inventors: Gabriel Radulescu, Loves Park, IL (US); Terrence R. Leibham, Galena, IL (US)

(73) Assignee: HAMILTON SUNDSTRAND CORPORATION, Charolette, NC (US)

( * ) Notice: Subject to any disclaimer, the term of this patent is extended or adjusted under 35 U.S.C. 154(b) by 0 days.

(21) Appl. No.: 17/245,527

(22) Filed: Apr. 30, 2021

(65) Prior Publication Data
US 2021/0351613 A1  Nov. 11, 2021

Related U.S. Application Data

(60) Provisional application No. 63/020,173, filed on May 5, 2020.

(51) Int. Cl.
| | |
|---|---|
| *H02J 13/00* | (2006.01) |
| *H04L 12/40* | (2006.01) |
| *B64D 31/00* | (2006.01) |
| *H02J 4/00* | (2006.01) |

(52) U.S. Cl.
CPC ........ *H02J 13/00016* (2020.01); *B64D 31/00* (2013.01); *H02J 4/00* (2013.01); *H04L 12/40045* (2013.01); *B64D 2221/00* (2013.01); *H02J 2310/44* (2020.01)

(58) Field of Classification Search
None
See application file for complete search history.

(56) References Cited

U.S. PATENT DOCUMENTS

| | | |
|---|---|---|
| 6,470,224 B1 | 10/2002 | Drake et al. |
| 7,805,204 B2 | 9/2010 | Ghanekar et al. |
| 9,110,972 B2 | 8/2015 | Hamdi et al. |
| 9,914,548 B1 | 3/2018 | Vadillo |
| 2014/0001887 A1 | 1/2014 | Ramamurthy et al. |

(Continued)

OTHER PUBLICATIONS

Extended European Search Report for EP Application No. 21169493.0, dated Sep. 24, 2021, pp. 1-9.

*Primary Examiner* — Daniel Kessie
*Assistant Examiner* — Terrence R Willoughby
(74) *Attorney, Agent, or Firm* — Cantor Colburn LLP

(57) ABSTRACT

A method of generating a customized secondary power distribution assembly (SPDA) includes generating one or more customizable SPDAs. Each of the one or more customizable SPDAs is a construct corresponding with a microprocessor configured to control a set of customizable channels in each of a set of virtual line replaceable modules (vLRMs). The method also includes creating a mapping between one of the one or more customizable SPDAs and the customized SPDA, the mapping indicating line replaceable modules (LRMs) of the customized SPDA and defining each channel of each LRM, and deploying the customized SPDA in an application. The microprocessor is initiated to control the customized SPDA according to the mapping at startup.

20 Claims, 4 Drawing Sheets

(56) References Cited

U.S. PATENT DOCUMENTS

| | | | |
|---|---|---|---|
| 2015/0006140 A1* | 1/2015 | Parikh | G06Q 50/06 |
| | | | 703/18 |
| 2018/0316223 A1 | 11/2018 | Wingrove et al. | |
| 2020/0331624 A1* | 10/2020 | Sheffield | H02J 4/00 |
| 2021/0309110 A1* | 10/2021 | Wiegman | B60L 3/0061 |

* cited by examiner

CUSTOMIZED SECONDARY POWER DISTRIBUTION ASSEMBLY GENERATED FROM CUSTOMIZABLE SECONDARY POWER DISTRIBUTION ASSEMBLY

CROSS-REFERENCE TO RELATED APPLICATIONS

This application claims the benefit of U.S. Provisional Application No. 63/020,173 filed May 5, 2020, the disclosure of which is incorporated herein by reference in its entirety.

BACKGROUND

Exemplary embodiments pertain to the art of power distribution and, in particular, to a customized secondary power distribution assembly (SPDA) generated from a customizable SPDA.

In aircraft and other applications, a number of electronic systems include electronic components that require alternating current (AC) or direct current (DC) power to function. A primary power assembly generates power, while a secondary power distribution assembly (SPDA) transforms or coverts the power from the primary power assembly to supply powered equipment. The SPDA supplies both AC and DC powered equipment.

BRIEF DESCRIPTION

In one embodiment, a method of generating a customized secondary power distribution assembly (SPDA) includes generating one or more customizable SPDAs. Each of the one or more customizable SPDAs is a construct corresponding with a microprocessor configured to control a set of customizable channels in each of a set of virtual line replaceable modules (vLRMs). The method also includes creating a mapping between one of the one or more customizable SPDAs and the customized SPDA, the mapping indicating line replaceable modules (LRMs) of the customized SPDA and defining each channel of each LRM, and deploying the customized SPDA in an application. The microprocessor is initiated to control the customized SPDA according to the mapping at startup.

Additionally or alternatively, in this or other embodiments, the generating includes generating two or more customizable SPDAs and each customizable SPDA of the two or more customizable SPDAs includes a different number of vLRMs.

Additionally or alternatively, in this or other embodiments, the generating includes defining a number of customizable channels for each of the vLRMs of each of the two or more customizable SPDAs.

Additionally or alternatively, in this or other embodiments, the generating includes generating two or more sets of the two or more customizable SPDAs and the number of customizable channels is different for each set of the two or more sets of the two or more customizable SPDAs.

Additionally or alternatively, in this or other embodiments, the method also includes selecting one of the two or more customizable SPDAs to create the mapping between the selected one of the two or more customizable SPDAs and the customized SPDA.

Additionally or alternatively, in this or other embodiments, the selecting includes determining which one of the two or more customizable SPDAs includes the number of vLRMs that is closest to but greater than a number of LRMs of the customized SPDA.

Additionally or alternatively, in this or other embodiments, the defining each channel of the LRM includes defining a channel as an alternating current (AC) or direct current (DC) solid state power controller or as a discrete input, discrete output, or analog input channel type.

Additionally or alternatively, in this or other embodiments, the method also includes treating one or more vLRMs as disabled LRMs based on the mapping.

Additionally or alternatively, in this or other embodiments, the method also includes terminating commands from the microprocessor to the disabled LRMs.

Additionally or alternatively, in this or other embodiments, the method also includes treating one or more customizable channels as disabled channels based on the mapping.

Additionally or alternatively, in this or other embodiments, the method also includes terminating commands from the microprocessor to the disabled channels.

Additionally or alternatively, in this or other embodiments, the application is an aircraft application.

Additionally or alternatively, in this or other embodiments, the generating includes generating two or more customizable SPDAs corresponding with two or more types of aircraft.

Additionally or alternatively, in this or other embodiments, the creating the mapping includes creating a table defining each LRM and each channel of each LRM of the customized SPDA.

Additionally or alternatively, in this or other embodiments, the creating the mapping includes controlling operation of the microprocessor corresponding with the one of the one or more customizable SPDAs in the customized SPDA.

In another embodiment a customized secondary power distribution assembly (SPDA) includes two or more line replaceable modules (LRMs). Each LRM includes one or more channels. The customized SPDA also includes a microprocessor to control the one or more channels of the two or more LRMs based on implementation of a mapping between virtual LRMs and channels to the one or more channels of each of the two or more LRMs during initiation. Commands from the microprocessor to unused ones of the virtual LRMs and channels based on the mapping are terminated.

Additionally or alternatively, in this or other embodiments, the mapping defines the one or more channels of the two or more LRMs in a form of a table.

Additionally or alternatively, in this or other embodiments, the one or more channels include an alternating current or direct current solid state power controller.

Additionally or alternatively, in this or other embodiments, the one or more channels include a discrete input, discrete output, or analog input channel type.

Additionally or alternatively, in this or other embodiments, the customized SPDA is deployed in an aircraft application.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, an SPDA supplies power to different powered components in an aircraft or other application. Generally, a given SPDA includes a microprocessor and a number of line replaceable modules (LRMs) housed in a chassis. Each LRM is a modular set of components of a particular type (e.g., AC or DC) with a particular number of channels. According to a prior approach, the number and type of the LRMs for a given SPDA is determined based on a particular application (e.g., aircraft of a specific size). Once the set of LRMs (i.e., the configuration of the SPDA) is determined, the microprocessor that commands the channels of the various LRMs is configured. This process of configuring the microprocessor of each SPDA, essentially from scratch, can have associated inefficiencies.

Embodiments of the systems and methods detailed herein relate to a customized SPDA generated from a customizable SPDA. As detailed, one or more generic (i.e., customizable) SPDAs are generated with virtual LRMs. For a particular application, only the mapping from the virtual LRMs to the actual LRMs needed for the application must be defined. A customizable SPDA specifically refers to a customizable configuration of a microprocessor. Once a real (i.e., customized) SPDA is defined, the customizable configuration of the microprocessor can be mapped to the specific configuration needed for the microprocessor to control the customized SPDA.

According to an exemplary embodiment, more than one customizable SPDA is generated. The customizable SPDAs are generated at different levels (e.g., with a different number of virtual LRMs). That is, different customizable configurations of the microprocessor are generated. Then, the customizable SPDA with a number of virtual LRMs that exceeds the number of actual LRMs by the least amount is selected. Any virtual LRMs that are not defined as actual LRMs are disabled. Thus, selecting from among the graduated levels of customizable SPDAs can increase the efficiency of customized SPDAs by facilitating minimization of the disabled LRMs in the customized SPDA. A large number of disabled LRMs can add a lag in the microprocessor operation of the customized SPDA. The graduated levels of customizable SPDAs may correspond with different types of aircraft, for example.

Figure 1:
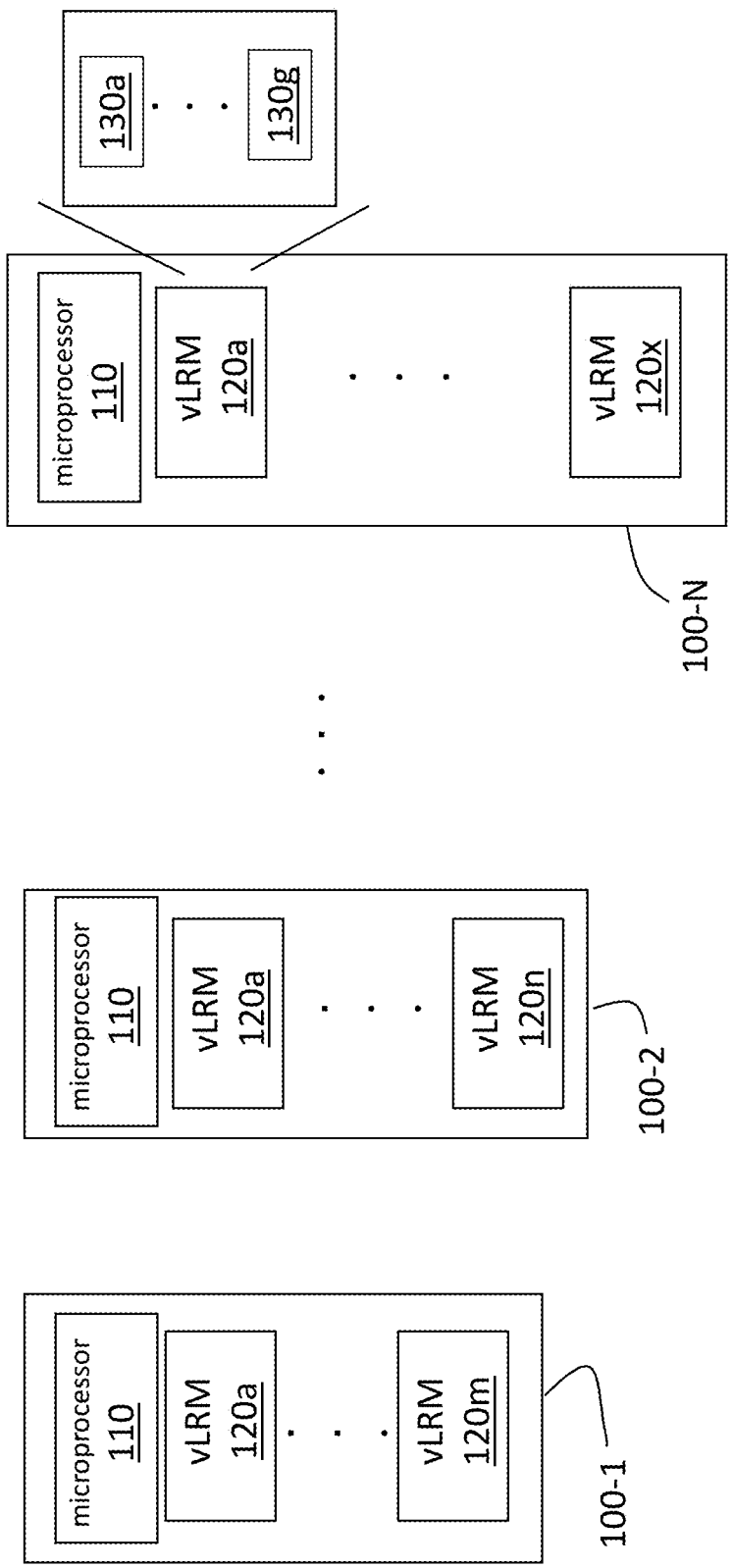
FIG. 1 is a block diagram of exemplary customizable secondary power distribution assemblies (SPDAs) used to generate customized SPDAs according to one or more embodiments.

FIG. 1 is a block diagram of exemplary customizable SPDAs 100 used to generate customized SPDAs 200 (FIG. 2) according to one or more embodiments. In FIG. 1, N customizable SPDAs 100-1 through 110-N (generally referred to as 100) are shown. Each customizable SPDA 100 includes a microprocessor 110. One exemplary customizable SPDA 110-1 includes virtual LRMs (vLRMs) 120a through 120m (generally referred to as 120). Another exemplary customizable SPDA 100-2 includes vLRMs 120a through 120n, and a last another exemplary customizable SPDA 100-N includes vLRMs 120a through 120x. In the exemplary set of customizable SPDAs 100, there is an increasing number of vLRMs 120 in the customizable SPDAs 100 from customizable SPDA 100-1 to customizable SPDA 100-N, as illustrated by their relative sizes.

Each customizable SPDA 100 represents a maximum configuration for the respective size. That is, each vLRM 120 includes a maximum number of customizable channels 130a through 130g (generally referred to as 130). This maximum number may be based on known configurations and may be selected to be greater than an expected number of channels according to the known configurations. According to one or more alternate embodiments, different sets of the customizable SPDAs 100 like the exemplary set of customizable SPDAs 100 shown in FIG. 1 may be generated. Each set of the customizable SPDAs 100 may include a different number of customizable channels 130. For example, each of one set of customizable SPDAs 100 may include 12 customizable channels 130 while another set of customizable SPDAs 100 may include 32 customizable channels 130. The microprocessor 110 of each customizable SPDA 100 is configured to control every customizable channel 130 of every vLRM 120. As previously noted, a customizable SPDA 100 is a construct used to explain the embodiments. Each customizable SPDA 100 essentially refers to one customizable configuration of the microprocessor 110.

Figure 2:
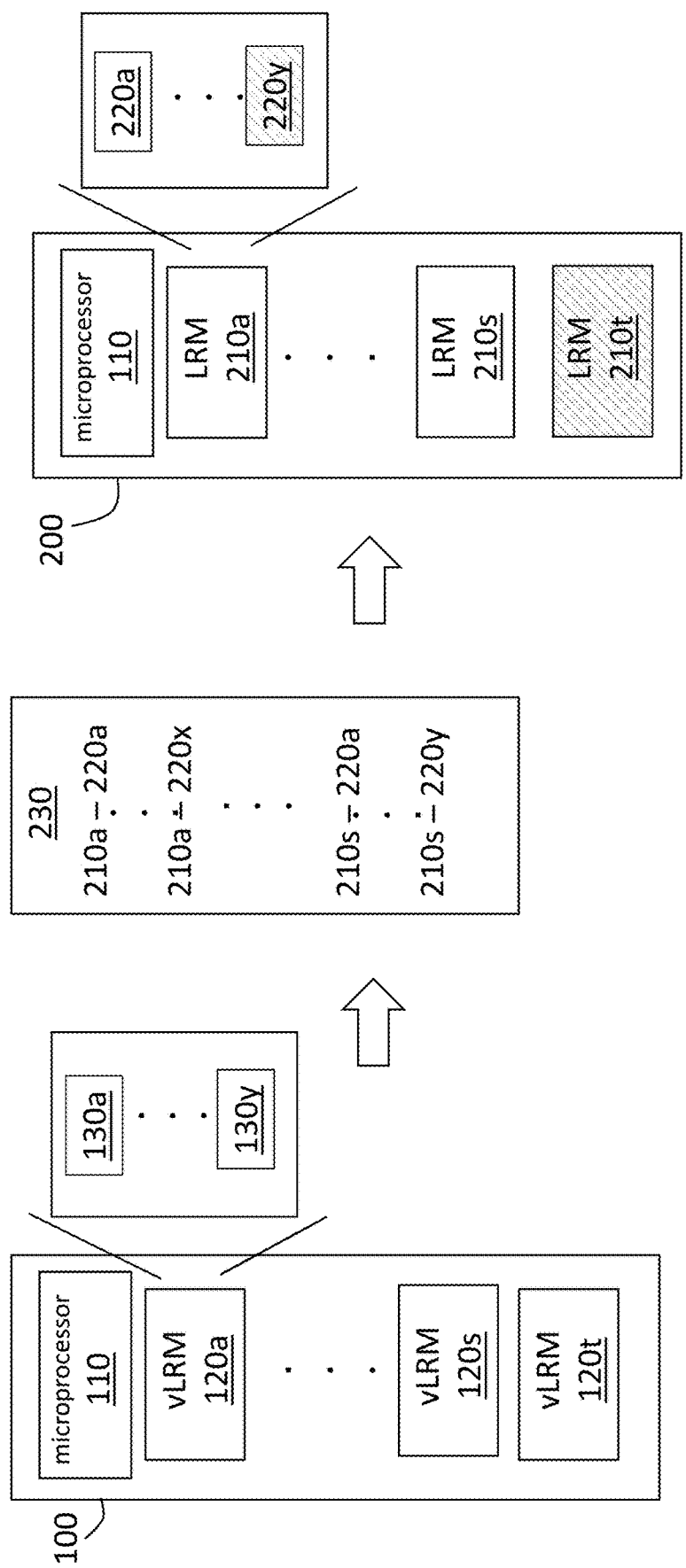
FIG. 2 shows a flow for obtaining a customized SPDA from a customizable SPDA according to one or more embodiments.

FIG. 2 shows a flow for obtaining a customized SPDA 200 from a customizable SPDA 100 according to one or more embodiments. An exemplary customizable SPDA 100 with vLRMs 120a through 120t is shown. Each vLRM 120 is shown to include customizable channels 130a through 130y. A mapping 230 is created in the form of a table, for example. The mapping 230 defines a number of channels 220 and the type (e.g., AC or DC) of each of the channels 220 for each LRM 210 of the customized SPDA 200. Any vLRMs 120 of the customizable SPDA 100 that exceeds the number of LRMs 210 needed in the SPDA 200 (i.e., the LRMs 210 defined in the mapping) is disabled. For example, vLRM 120t in the customizable SPDA 100 becomes a disabled LRM 210t in the customized SPDA 200, as shown in FIG. 2, because the mapping 230 only defines LRMs 210a through 210s.

In addition, within defined LRMs 210 in the mapping, not all the available customizable channels 130 may be defined. Any unused customizable channels 130 in the customizable SPDA 100 become disabled channels 220 in the customized SPDA 200. For example, if LRM 210a is defined as including some number of AC SSPCs and some number of DC SSPCs such that one of the customizable channels 130 of vLRM 120a is unused, then, as shown in FIG. 2, channel 220y is disabled in LRM 210a. Exemplary channel types include AC or DC solid state power controllers (SSPC). Other exemplary channel types include discrete input, discrete output, and analog input channel types. Because the customizable channels 130 need not be defined, the customizable SPDA 100 construct facilitates the use of additional and new channel types with minimal, if any, impact on the microprocessor 110 that is developed for the customizable SPDA 100.

The configuration of the customized SPDA 200 will be initiated at powerup (i.e., the mapping will be applied). That is, the microprocessor 110 that was generically configured to control vLRMs 120 with customizable channels 130 will be initiated to control LRMs 210 with channels 220 in the customized SPDA 200 at startup based on the mapping 230. Thus, although vLRMs 120 and customizable channels 130 are shown in FIGS. 1 and 2 for explanatory purposes as part of customizable SPDAs 100, these are not physical components. The mapping 230 represents additional instructions that refine the customizable configuration of the microprocessor 110 to allow the microprocessor 110 to control the actual channels 220 of the physical LRMs 210 of the customized SPDA 200.

The customizable SPDA 100 and its components (e.g., vLRMs 120, customizable channels 130) are constructs that are used to define the customizable configuration of each microprocessor 110 corresponding with each customizable SPDA 100. Once physical LRMs 210 and channels 220 are assembled with the microprocessor 110 in a customized SPDA 200, the mapping 230 will define how the microprocessor 110 is initiated upon startup. As a result of the mapping 230, the microprocessor 110 will only communicate with and control LRMs 210 and channels 220 that are actually present in the customized SPDA 200.

While the microprocessor 110 commands will only reach real LRMs 210 and channels 220 in the customized SPDA 200, the presence of disabled LRMs 210 and channels 220 (i.e., vLRMs 120 and customizable channels 130 that were not needed) may represent a lag time in the microprocessor 110. This is because the microprocessor 110 may still issue commands to the disabled components that are terminated prior to reaching any actual LRM 210 or channel 220. According to alternate embodiments, the lag time may be based the microprocessor 110 determining that particular commands are directed to disabled components and, thus, should be terminated. As previously noted, the selection of the closest customizable SPDA 100 (i.e., one that has a number of vLRMs 120 that meet or exceed, by the least amount, the number of LRMs 210 needed) ensures that the number of disabled LRMs 210 and disabled channels 220 is minimized and, consequently, lag time of the microprocessor 110 is minimized in the customized SPDA 200.

Figure 3:
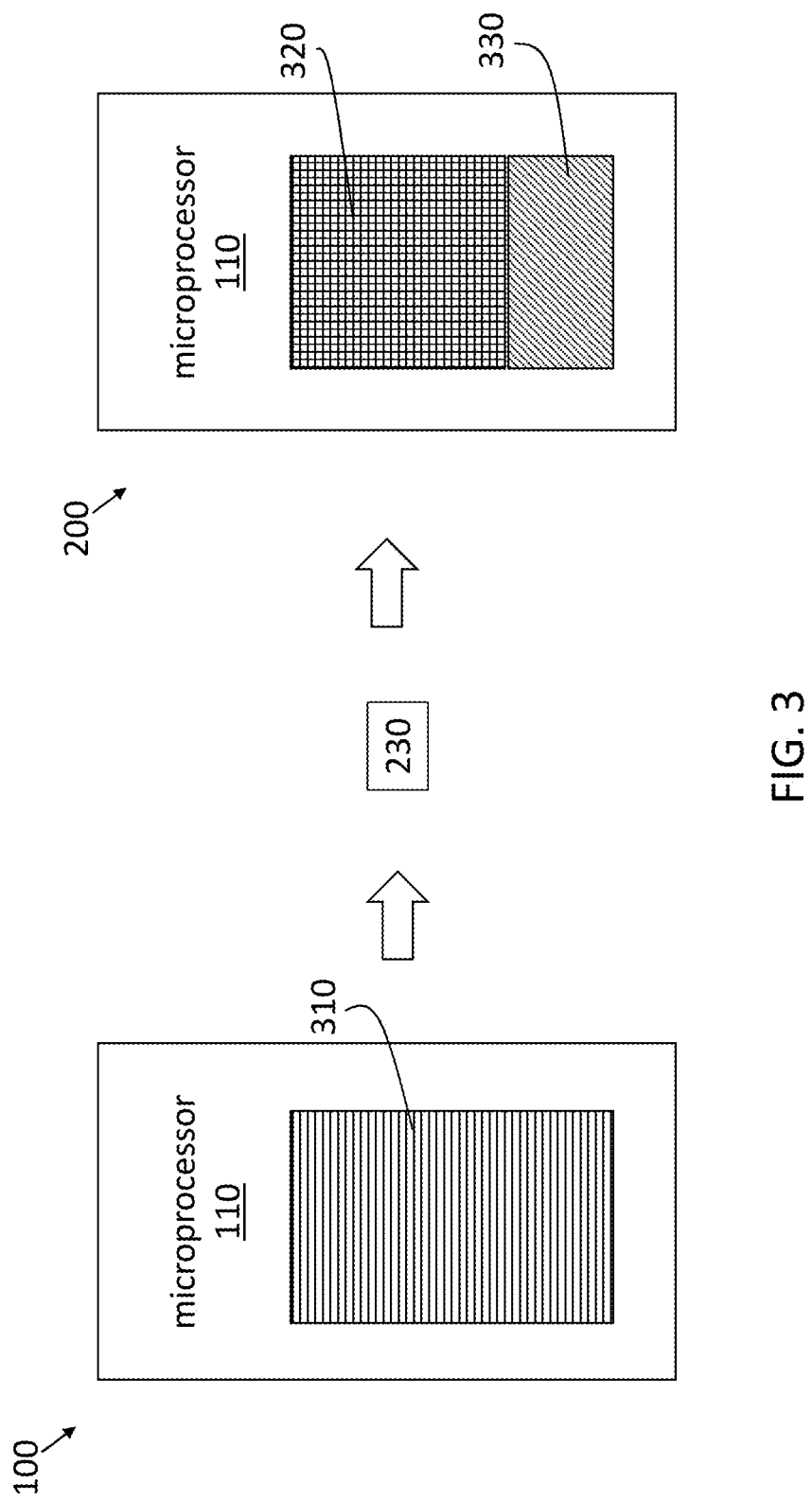
FIG. 3 illustrates changes in a microprocessor of a customizable SPDA to obtain the customized SPDA according to one or more embodiments.

FIG. 3 illustrates changes in a microprocessor 110 of a customizable SPDA 100 to obtain the customized SPDA 200 according to one or more embodiments. The microprocessor 110 in the customizable SPDA 100 includes customizable instructions 310 that control the vLRMs 120 and their customizable channels 130. The mapping 230 defines which of those vLRMs 120 will be defined and implemented as physical LRMs 210 and also which customizable channels 130 will be defined and implemented as channels 220 in the customized SPDA 200. As a result, the microprocessor 110, when initiated in the customized SPDA 200, includes customized instructions 320 and disabled instructions 330. The customized instructions 320 allow the microprocessor 110 to instruct the specific types of channels 220 in the real LRMs 210 of the customized SPDA 200. The disabled instructions 330 correspond with vLRMs 120 and customizable channels 130 that exceeded the numbers needed in the customized SPDA 200. If the customized SPDA 200 is expanded, the instructions related to some of the disabled vLRMs 120 and/or customizable channels 130 can be employed based on a new mapping 230.

Figure 4:
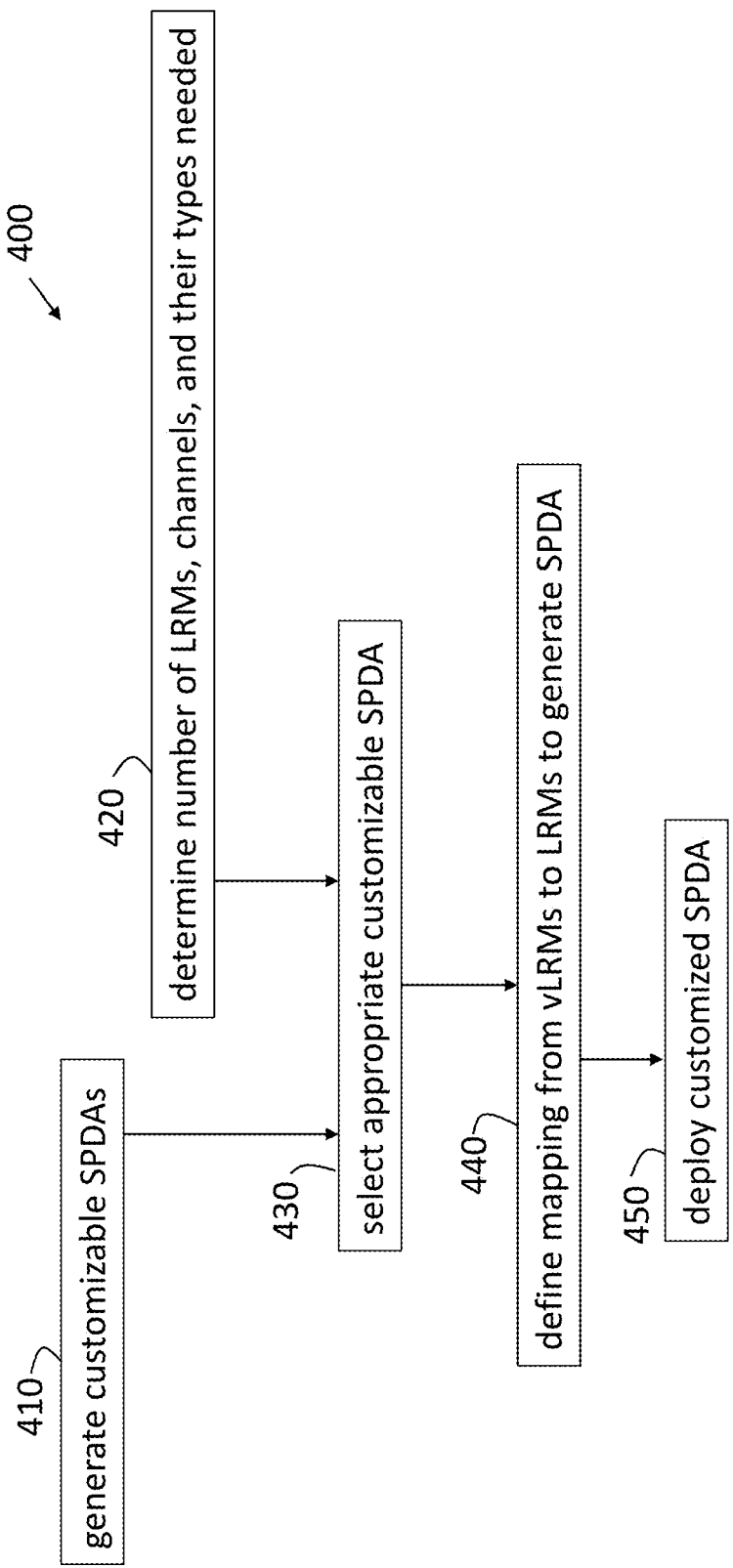
FIG. 4 shows the process flow of a method of generating a customized SPDA using a customizable SPDA according to one or more embodiments.

FIG. 4 shows the process flow of a method 400 of generating a customized SPDA 200 using a customizable SPDA 100 according to one or more embodiments. At block 410, generating one or more customizable SPDAs 100 may include generating multiple sets of the customizable SPDAs 100 with different numbers of customizable channels 130, as discussed with reference to FIG. 1. Generally, generating a set of customizable SPDAs 100 includes configuring the microprocessor 110 corresponding with each customizable SPDA 100 within the set to control a different number of vLRMs 120 that include a specified number of customizable channels 130. The processes at block 310 may be performed before any deployment or customization in a particular application. The remaining processes of the method 400 represent application-specific processes. As previously noted, generating a customizable SPDA 100 refers to generating a particular customizable configuration of the microprocessor 110 based on a virtual arrangement rather than to building a physical assembly.

At block 420, the processes include determining the number of LRMs 210, channels 220, and their types that are needed in the customized SPDA 200. This determination may be based on an application (e.g., aircraft application) and particular configuration (e.g., aircraft size). According to the prior approach, this determination is followed by a development, from scratch, of the desired SPDA. According to one or more embodiments, the determination at block 420 leads to a selection, at block 430, from among the customizable SPDAs 100 that are available according to block 410. As previously noted, a customizable SPDA 100 is not a physical assembly. Thus, selection of a customizable SPDA 100 refers to selection of a customizable configuration of a microprocessor 110.

As previously noted, when more than one customizable SPDA 100 is available, the closest one to the needed configuration may be selected for efficiency. The closest customizable SPDA 100 has a number of vLRMs 120 that is closest to but greater than the number of LRMs determined at block 420. When multiple sets of customizable SPDAs 100 are available with different numbers of customizable channels 130, the selection includes first selecting the set with the number of customizable channels 130 that is closest to but greater than the number of channels 220 determined at block 420.

At block 440, the processes include defining a mapping 230 from the vLRMs 120 of the customizable SPDA 100 (selected at block 430) to the LRMs 220 needed in the customized SPDA 200. This mapping 230 may be a table defining the LRMs 210 needed along with each type of channel 220 needed in each LRM 210. This mapping 230 is added to the customizable configuration of the microprocessor 110 to obtain the configuration of the microprocessor 110 needed for the customized SPDA 200. At block 450, deploying the customized SPDA 200 refers to the configuration, which is determined at block 420 and defined by the mapping 230, being initialized in the microprocessor 110 at startup in the particular application (e.g., aircraft). Specifically, at powerup, the microprocessor 110 will be initiated to control the real LRMs 210 and channels 220 of the customized SPDA 100 physical assembly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of generating a customized secondary power distribution assembly (SPDA), the method comprising:
   generating one or more customizable SPDAs, wherein each of the one or more customizable SPDAs is a construct corresponding with a microprocessor configured to control a set of customizable channels in each of a set of virtual line replaceable modules (vLRMs);
   creating a mapping between one of the one or more customizable SPDAs and the customized SPDA, the mapping configuring the microprocessor to control line replaceable modules (LRMs) of the customized SPDA and defining each channel of each LRM and the configuring including disabling control of any vLRMs among the set of vLRMs of the one of the one or more customizable SPDAs that are additional to vLRMs among the set of vLRMs that correspond with the LRMs of the customized SPDA; and
   deploying the customized SPDA in an application, wherein the microprocessor is initiated to control the customized SPDA according to the mapping at startup.

2. The method according to claim 1, wherein the generating includes generating two or more customizable SPDAs and each customizable SPDA of the two or more customizable SPDAs includes a different number of vLRMs.

3. The method according to claim 2, wherein the generating includes defining a number of customizable channels for each of the vLRMs of each of the two or more customizable SPDAs.

4. The method according to claim 3, wherein the generating includes generating two or more sets of the two or more customizable SPDAs and the number of customizable channels is different for each set of the two or more sets of the two or more customizable SPDAs.

5. The method according to claim 2, further comprising selecting the one of the two or more customizable SPDAs to create the mapping between the selected one of the two or more customizable SPDAs and the customized SPDA.

6. The method according to claim 5, wherein the selecting includes determining which one of the two or more customizable SPDAs includes the number of vLRMs that is closest to but greater than a number of LRMs of the customized SPDA.

7. The method according to claim 3, wherein the defining each channel of the LRM includes defining a channel as an alternating current (AC) or direct current (DC) solid state power controller or as a discrete input, discrete output, or analog input channel type.

8. The method according to claim 1, further comprising treating one or more vLRMs as disabled LRMs based on the mapping.

9. The method according to claim 8, wherein the disabling control includes terminating commands from the microprocessor to the disabled LRMs.

10. The method according to claim 1, further comprising treating one or more customizable channels as disabled channels based on the mapping.

11. The method according to claim 10, wherein the disabling control includes terminating commands from the microprocessor to the disabled channels.

12. The method according to claim 1, wherein the application is an aircraft application.

13. The method according to claim 12, wherein the generating includes generating two or more customizable SPDAs corresponding with two or more types of aircraft.

14. The method according to claim 1, wherein the creating the mapping includes creating a table defining each LRM and each channel of each LRM of the customized SPDA.

15. The method according to claim 1, wherein the creating the mapping includes controlling operation of the microprocessor corresponding with the one of the one or more customizable SPDAs in the customized SPDA.

16. A customized secondary power distribution assembly (SPDA) comprising:
   two or more line replaceable modules (LRMs), each LRM including one or more channels; and
   a microprocessor configured to control the one or more channels of the two or more LRMs based on implementation of a mapping between virtual LRMs and channels to the one or more channels of each of the two or more LRMs during initiation, wherein commands from the microprocessor to unused ones of the virtual LRMs and channels based on the mapping are terminated.

17. The customized SPDA according to claim 16, wherein the mapping defines the one or more channels of the two or more LRMs in a form of a table.

18. The customized SPDA according to claim 16, wherein the one or more channels include an alternating current or direct current solid state power controller.

19. The customized SPDA according to claim 16, wherein the one or more channels include a discrete input, discrete output, or analog input channel type.

20. The customized SPDA according to claim 16, wherein the customized SPDA is deployed in an aircraft application.

* * * * *